United States Patent
Hirayama et al.

(10) Patent No.: US 9,568,047 B2
(45) Date of Patent: Feb. 14, 2017

(54) HIGH-STRENGTH BRASS ALLOY FOR SLIDING MEMBER, AND SLIDING MEMBER

(71) Applicant: OILES CORPORATION, Tokyo (JP)

(72) Inventors: Maki Hirayama, Fujisawa (JP); Taku Watakabe, Fujisawa (JP); Kentaro Okubo, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 55 days.

(21) Appl. No.: 14/549,937

(22) Filed: Nov. 21, 2014

(65) Prior Publication Data
US 2015/0159694 A1  Jun. 11, 2015

Related U.S. Application Data

(62) Division of application No. 13/635,869, filed as application No. PCT/JP2010/058667 on May 21, 2010, now Pat. No. 8,950,941.

(51) Int. Cl.
| | |
|---|---|
| *C22C 9/04* | (2006.01) |
| *F16C 33/10* | (2006.01) |
| *F16C 33/12* | (2006.01) |

(52) U.S. Cl.
CPC ............. *F16C 33/121* (2013.01); *C22C 9/04* (2013.01); *F16C 2202/04* (2013.01); *F16C 2204/50* (2013.01)

(58) Field of Classification Search
None
See application file for complete search history.

(56) References Cited

U.S. PATENT DOCUMENTS

| | | | |
|---|---|---|---|
| 4,505,987 A | 3/1985 | Yamada et al. | |
| 4,559,249 A | 12/1985 | Arigaya et al. | |
| 4,676,848 A | 6/1987 | Ruchel et al. | |
| 4,750,953 A * | 6/1988 | Tabei .................. | C22C 9/04 148/402 |
| 4,851,191 A | 7/1989 | Lee et al. | |

(Continued)

FOREIGN PATENT DOCUMENTS

| | | |
|---|---|---|
| DE | 3809994 A1 | 10/1988 |
| GB | 2011947 A | 7/1979 |

(Continued)

OTHER PUBLICATIONS

Japanese Industrial Standards JIS H5120, Oct. 20, 2009 (Japanese with English translation).

*Primary Examiner* — Devang R Patel
(74) *Attorney, Agent, or Firm* — patenttm.us

(57) ABSTRACT

High-strength brass alloy having superior wear maintains single-structure β phase and Fe—Cr—Si-based intermetallic compounds dispersed in the β phase. A high-strength brass alloy for sliding member comprises Zn from 17% to 28%, Al from 3% to 10%, Fe from 1% to 4%, Cr from 0.1% to 4%, Si from 0.5% to 3%, mass ratio, and the remnant including Cu and inevitable impurities. The high-strength brass alloy has structure in which the matrix shows single-phase structure of β phase and Fe—Cr—Si-based intermetallic compounds are dispersed in the β phase. The high-strength brass alloy for sliding member has the structure in which the matrix shows single-structure of β phase and hard Fe—Cr—Si-based intermetallic compounds are dispersed in the β phase. Thus the hardness is increased and wear resistance is improved.

1 Claim, 4 Drawing Sheets

(56) References Cited

U.S. PATENT DOCUMENTS

| | | | |
|---|---|---|---|
| 4,995,924 | A | 2/1991 | Akutsu |
| 5,069,874 | A | 12/1991 | Shirosaki et al. |
| 5,415,791 | A | 5/1995 | Chou et al. |
| 5,516,213 | A | 5/1996 | Moriyama et al. |
| 6,071,361 | A | 6/2000 | Sato et al. |
| 6,095,690 | A | 8/2000 | Niegel et al. |
| 6,428,744 | B1 * | 8/2002 | Takayama ................. B22F 3/26 419/2 |
| 6,475,635 | B1 * | 11/2002 | Sakai .................... B22F 1/0003 148/536 |
| 8,202,825 | B2 | 6/2012 | Yamamoto |
| 2007/0227631 | A1 | 10/2007 | Gaag et al. |
| 2008/0219881 | A1 | 9/2008 | Gaag |
| 2010/0047612 | A1 | 2/2010 | Kugo et al. |

FOREIGN PATENT DOCUMENTS

| | | | |
|---|---|---|---|
| JP | 51-41569 | | 11/1976 |
| JP | 57076143 | A | 5/1982 |
| JP | 60149740 | A * | 8/1985 |
| JP | 62-57700 | | 12/1987 |
| JP | S63-238249 | | 10/1988 |
| JP | 64-21028 | A | 1/1989 |
| JP | 01021028 | A | 1/1989 |
| JP | H01-252745 | | 10/1989 |
| JP | H2-38651 | | 8/1990 |
| JP | 07026341 | A * | 1/1995 |
| JP | H07-317804 | A2 | 12/1995 |
| JP | 11166539 | A | 6/1999 |
| KR | 1991-0009871 | | 12/1991 |

* cited by examiner

HIGH-STRENGTH BRASS ALLOY FOR SLIDING MEMBER, AND SLIDING MEMBER

TECHNICAL FIELD

The present invention relates to high-strength brass alloy having superior wear resistance, and particularly to the high-strength brass alloy suitable for use in a sliding member such as a sliding bearing or a sliding plate and to a sliding member using that high-strength brass alloy.

BACKGROUND ART

As conventional high-strength brass alloy used for a sliding member such as a bearing, can be mentioned the high-strength brass casting classes 1-4 prescribed in Japanese Industrial Standard JISH5120 (See Non-Patent Document 1). These high-strength brass alloys are obtained by adding elements such as Al, Fe, Mn and the like to Cu—Zn alloy to improve corrosion resistance in sea water, toughness, wear resistance and hardness, and used frequently for sliding applications such as a synchronizer ring in a transmission mechanism of an automobile, a gear wheel in an ordinary machine, and a bearing.

In the high-strength brass alloy, there appear various matrices such as $\alpha$ phase, $\beta$ phase, $\alpha+\beta$ phase and $\gamma$ phase according to zinc equivalents of added elements. When the zinc equivalent is smaller, $\alpha$ phase appears. Although the high-strength brass alloy in which $\alpha$ phase has appeared is superior in toughness, its hardness is inferior and, when put to sliding applications, easily shows abrasive wear. Further, when the zinc equivalent is increased, $\beta$ phase appears. Then with further increase of the zinc equivalent, $\gamma$ phase appears. The high-strength brass alloy in which $\gamma$ phase has appeared has the advantages of increased hardness and improved wear resistance. But on the other hand, its toughness is significantly reduced and its shock resistance becomes lowered.

Thus, in the sliding applications, the high-strength brass alloy whose matrix is single phase of $\beta$ phase is widely used since its toughness is not reduced and its wear resistance is superior. However, as efficiency and longer life of mechanical equipment are promoted recently, it is desired further to improve wear resistance of the sliding member of the high-strength brass alloy.

For improving wear resistance of the high-strength brass alloy having the matrix of $\alpha+\beta$ phase or $\beta$ phase, is proposed the high-strength brass alloy having the matrix in which a manganese silicide type intermetallic compounds such as $Mn_5Si_3$ are dispersed (See Patent Document 1, for example), or the high-strength brass alloy having the matrix in which Fe—Mn—Si-based intermetallic compounds are dispersed (See Patent Documents 2 and 3, for example).

DESCRIPTION OF THE RELATED ART

Non-Patent Document

Non-Patent Document 1: Japanese Industrial Standard JISH5120

Patent Documents

Patent Document 1: Japanese Published Examined Application No. 51-41569;
Patent Document 2: Japanese Published Examined Application No. 62-57700; and
Patent Document 3: Japanese Published Examined Application No. 2-38651

SUMMARY OF INVENTION

Technical Problem

Although it is known that dispersion of manganese silicide or Fe—Mn—Si-based intermetallic compound in the matrix has the effect of improving wear resistance, the zinc equivalent of Si is 10, which is extremely high among those of elements added in high-strength brass alloy. Thus, since addition of Si increases the zinc equivalent, the amount of addition of another element is restricted in order to maintain the matrix of single-phase structure of $\beta$ phase. Here, as another element, Al is known for example. Al improves corrosion resistance and strengthens the matrix. However, the zinc equivalent of Al is extremely as high as 6. Thus, when the amount of addition of Al increases, $\gamma$ phase appears in the matrix. Thus, when Al is added together with Si mentioned above, the zinc equivalent increases and $\gamma$ phase is produced in the matrix. As a result, although wear resistance increases, ductility reduces extremely. Thus, even when it is tried to improve wear resistance by adding Si, it is unavoidable to reduce the amount of addition of Al. Thus, it was difficult to improve wear resistance while maintaining single-phase structure of $\beta$ phase.

After great deal of effort has been made considering the above circumstances, the present inventors have focused on Cr as an element that improves corrosion resistance and at the same time generates the intermetallic compound of Fe and Si, which are ingredients of the high-strength brass alloy. The present inventors have confirmed that in high-strength brass alloy to which Cr is added in a prescribed proportion, the matrix maintains single-phase structure of $\beta$ phase, and Fe—Cr—Si-based intermetallic compounds have been dispersedly precipitated, and have found that corrosion resistance and wear resistance of the high-strength brass alloy have been improved further.

The present invention has been made on the basis of the above findings. And an object of the present invention is to provide the high-strength brass alloy for the sliding member, which maintains the matrix of single-phase structure of $\beta$ phase, has structure in which Fe—Cr—Si-based intermetallic compounds are dispersed in the $\beta$ phase, and thus is superior in wear resistance. Another object of the present invention is to provide the sliding member using that high-strength brass alloy.

Solution to Problem

To achieve the above objects, the present invention provides high-strength brass alloy for sliding member, wherein:
(1) the high-strength brass alloy comprises, in terms of mass ratios, Zn in a range of from 17% or more to 28% or less, Al in a range of from 3% or more to 10% or less, Fe in a range of from 1% or more to 3% or less, Cr in a range of from 0.1% or more to 4% or less, Si in a range of from 0.5% or more to 2% or less, and the remnant including Cu and inevitable impurities; and
(2) a matrix shows single-phase structure of $\beta$ phase, and structure in which Fe—Cr—Si-based intermetallic compounds are dispersed in the $\beta$ phase.

Further, to achieve the above objects, the present invention provides a sliding member, wherein:
(3) the sliding member has a cylindrical body made of the high-strength brass alloy for sliding member described in the above (1) and (2); a plurality of holes or grooves are formed at least in an inner periphery as a sliding surface of the cylindrical body; and solid lubricant is filled and fixed in the holes or grooves.

Further, to achieve the above objects, the present invention provides another sliding member, wherein:
(4) the sliding member has a plate body made of the high-strength brass alloy for sliding member described in the above (1) and (2); a plurality of holes, grooves or recesses are formed in a surface as a sliding surface of the plate body; and solid lubricant is filled and fixed in the holes, grooves or recesses.

Further, it is favorable that:
(5) an area of the solid lubricant is in a range of from 10% or more to 40% or less of an area of the inner periphery or the surface as the sliding surface.

Advantageous Effects of Invention

According to the present invention, the matrix shows single-phase structure of β phase, and, in that structure, hard Fe—Cr—Si-based intermetallic compounds are dispersed in the β phase. Thus, it is possible to provide the high-strength brass alloy having increased hardness and further-improved wear resistance and to provide the sliding member using the high-strength brass alloy.

Figure 1:
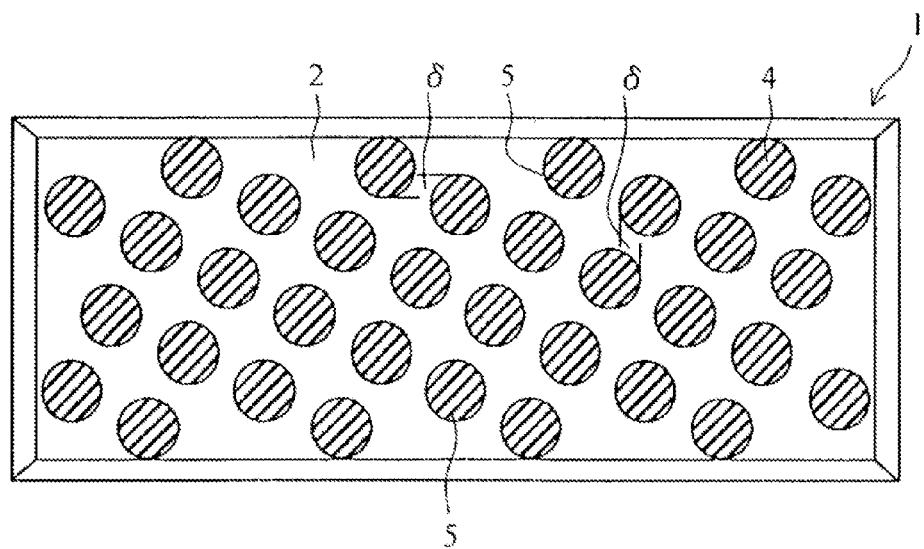
FIG. 1 is a plan view showing a plate-shaped sliding member of an embodiment of the present invention.

REFERENCE SIGNS LIST 1, 1a, 1b sliding member
2, 2a, 2b sliding member substrate
3, 3a, 3b sliding surface
4 recess
4a groove
4b hole
5 solid lubricant

DESCRIPTION OF EMBODIMENTS

Next, the present invention and its embodiments will be described further in detail. Needless to say, the present invention is not limited to these embodiments.

According to the present invention, a high-strength brass alloy for a sliding member comprises, in terms of mass ratios, Zn: 17-28%, Al: 3-10%, Fe: 1-4%, Cr: 0.1-4%, and Si: 0.5-3%, with the remnant including Cu and inevitable impurities. In the following, a component composition of the high-strength brass alloy of the present invention will be described.

Zn is an element that contributes to strength, wear resistance and corrosion resistance to lubricating oil and determines structure of the matrix. According to the amount of addition of Zn, there appears a phase such as α phase, β phase or γ phase in the structure of the matrix. The amount of addition of Zn varies depending on the zinc equivalents and the amount of addition of the other added elements. When, however, the amount of addition of Zn is less than 17% by mass, α phase appears in the structure of the matrix, deteriorating the wear resistance. On the other hand, when the amount of addition of Zn is larger than 28% by mass, γ phase appears in the structure of the matrix, making the alloy brittle. Thus, the amount of addition of Zn is 17-28% by mass.

Al is an element that promotes generation of β phase and effective for increasing the hardness. Further, similarly to Si, the zinc equivalent of Al is large and Al assists generation of γ phase structure. However, when the amount of addition of Al is less than 3% by mass, sufficient hardness required for wear resistance cannot be obtained, and also sufficient strengthening of the matrix cannot be attained. On the other hand, when the amount of addition of Al is larger than 10% by mass, γ phase structure is generated, making the alloy brittle. Thus, the amount of addition of Al is 3-10% by mass, and favorably 4-6% by mass.

Fe binds with the below-mentioned Si and Cr and precipitates hard intermetallic compounds of Fe—Cr—Si-based, to improve wear resistance. When the amount of addition of Fe is less than 1% by mass, the amount of the precipitation of Fe—Cr—Si-based intermetallic compounds is small, and thus its improvement effect on wear resistance is insufficient. Also miniaturization of alloy structure is impaired and mechanical properties could be deteriorated. On the other hand, when the amount of addition of Fe is larger than 4% by mass, the amount of the precipitation of Fe—Cr—Si-based intermetallic compounds is large, to reduce wear resistance indeed. Thus, the amount of addition of Fe is 1-4% by mass.

Cr binds with the above-mentioned Fe and the below-mentioned Si to precipitate hard Fe—Cr—Si-based intermetallic compounds, and thus contributes to improvement of wear resistance. When the amount of addition of Cr is less than 0.1% by mass, Cr does not contribute to improvement of wear resistance. On the other hand, when the amount of addition of Cr is larger than 4% by mass, it causes worsening of machinability and castability. Thus, the amount of addition of Cr is 0.1-4% by mass.

Si binds with the above-mentioned Fe and Cr to precipitate hard Fe—Cr—Si-based intermetallic compounds, and thus contributes to improvement of wear resistance. When the amount of addition of Si is less than 0.5% by mass, Si does not contribute to improvement of wear resistance. On the other hand, when the amount of addition of Si is larger than 3% by mass, it causes appearance of γ phase, which might worsen wear resistance. Thus, the amount of addition of Si is 0.5-3% by mass.

The high-strength brass alloy of the present invention can be casted into a plate shape, to form a plate-like body. One surface of the plate-like body is used as a sliding surface, and a plurality of holes or grooves are formed in that surface. And solid lubricant such as graphite is filled and fixed in the holes or grooves, to obtain a solid-lubricant-embedded type sliding member.

FIG. 1 is a plan view showing a sliding member (sliding plate) 1 having a plate-like shape formed of the high-strength brass alloy of the present invention. In one surface (sliding surface) of a sliding member substrate 2 of the high-strength brass alloy, are formed a plurality of recesses 4 recessed in the thickness direction. These recesses 4 are formed such that the sum of areas of the openings is 10-40% of the surface area of the sliding member substrate 2.

The recesses 4 are for the purpose of being filled with and holding solid lubricant 5 such as graphite. In order that the substrate 2 and the solid lubricant 5 produce good wear resistance effects, the sum of the areas of the openings of the recesses 4 should be at least 10% of the total area of the surface of the sliding member substrate 2. However, when the sum of the areas of the openings of the recesses 4 exceeds 40% of the surface area of the sliding member substrate 2, the strength of the sliding member substrate 2 deteriorates. The recesses 4 are formed by drilling work or cutting work using a drill or an end mill, although another means can be used to form the recesses 4.

Favorably the solid lubricant 5 filled and held in a plurality of recesses 4 formed in the surface of the sliding member substrate 2 is arranged such that a plurality of the solid lubricants 5 which adjoin mutually overlap with each other (with overlap length δ) in one direction or two orthogonal directions.

FIG. 1 shows an example where the solid lubricant 5 filled and held in a plurality of recesses 4 formed in the surface of the sliding member substrate 2 is arranged such that a plurality of the solid lubricants 5 which adjoin mutually overlap with each other in two orthogonal directions.

Further, the high-strength brass alloy of the present invention can be cast into a cylindrical shape, to form a cylindrical body. A plurality of holes or grooves are formed at least in an inner periphery as a sliding surface of the cylindrical body, and solid lubricant such as graphite is filled and fixed in the holes or grooves, to obtain a solid-lubricant-embedded type sliding member.

Figure 2:
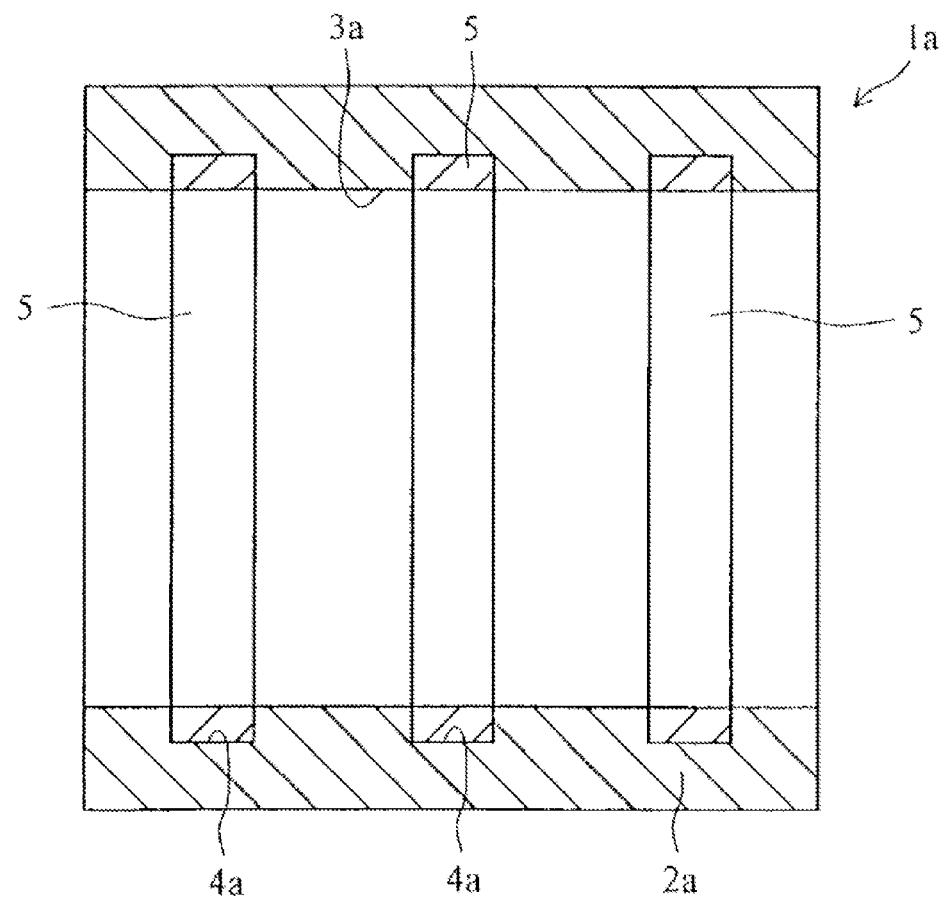
FIG. 2 is a cross section showing a cylinder-shaped sliding member of an embodiment of the present invention.

FIG. 2 is a cross section showing a sliding member (cylindrical bearing) 1a having a form of a cylindrical bush that was made using the high-strength brass alloy of the present invention. In an inner periphery (sliding surface) 3a of a sliding member substrate 2a of the high-strength brass alloy, are formed a plurality of grooves 4a of ring shapes arranged in the longitudinal direction. Similarly to the case of the above-described sliding member 1, these grooves 4a are formed such that the sum of areas of the openings of the grooves 4a is 10-40% of the area of the inner periphery 3a of the sliding member substrate 2a. This ratio is selected for the same reason why the above-mentioned ratio 10-40% is selected. The grooves 4a are formed by cutting work using a cutting tool or the like, although another means may be used to form the grooves 4a.

Figure 3:
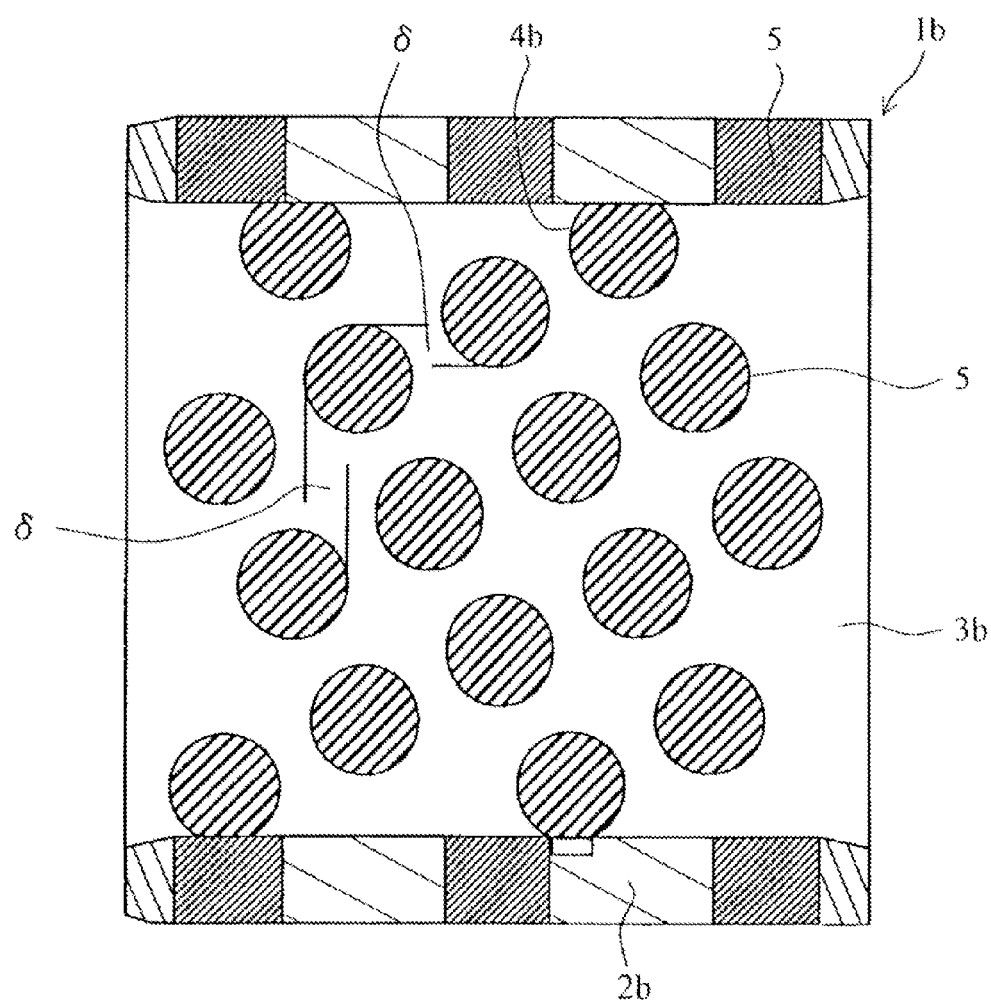
FIG. 3 is a cross section showing another example of cylinder-shaped sliding member of an embodiment of the present invention.

FIG. 3 is a cross section showing a sliding member 1b having a form of a cylindrical bush that was made using the high-strength brass alloy of the present invention. In the sliding member 1b, are formed a plurality of cylindrical holes 4b passing through the sliding member 1b from the inner periphery (sliding surface) 3b to the outer periphery. And these holes 4b are filled with solid lubricant such as graphite. Similarly to the case of the above-described sliding member 1, these holes 4b are formed such that the sum of areas of the openings is 10-40% of the area of the inner periphery 3b of the sliding member substrate 2b. This ratio also is selected for the same reason why the above-mentioned ratio 10-40% is selected. These holes 4b are formed by drilling work using a drill or the like, although another means may be used to form the holes 4b.

It is favorable that the solid lubricant 5 is filled and fixed in the holes 4b formed such that a plurality of the solid lubricants 5 which adjoin mutually overlap with each other in the axial direction, or that the solid lubricant 5 is filled and fixed in the holes 4b formed such that a plurality of the solid lubricants 5 which adjoin mutually overlap with each other in the circumferential direction, or that the solid lubricant 5 is filled and fixed in the holes 4b formed such that a plurality of the solid lubricants 5 which adjoin mutually overlap with each other in the axial and circumferential directions.

FIG. 3 shows an example where the solid lubricant 5 filled and held in a plurality of holes 4b formed in the sliding member substrate 2b of a cylindrical shape is arranged such that portions of the solid lubricant 5 overlap with each other (with overlap length δ) in two directions i.e. the axial and circumferential directions.

Example 1

Next, the present invention will be described in detail referring to examples. Of course, the present invention is not limited to the following examples.

(1) Examples 1-5 and Comparative Examples 1-2

In order to obtain each chemical composition of Table 1, electrolytic Cu, Zn, Al, Cu—Fe mother alloy, Si—Cu mother alloy, Cu—Cr mother alloy and Fe—Al mother alloy were melted in a low frequency melting furnace, and then casted into a sand mold of 50 mm in inner diameter, 80 mm in outer diameter and 100 mm in length at a melting temperature of 1100 degrees Celsius or higher, to produce a cylindrical body. Then, the cylindrical body was subjected to machining process to produce a cylindrical bearing of 60 mm in inner diameter, 75 mm in outer diameter and 50 mm in length. In the inner periphery of the obtained cylindrical bearing, a plurality of through holes of 10 mm in diameter were formed in the thickness direction such that the total opening area of the holes was 30% of the area of the inner periphery. And, solid lubricant comprising graphite was filled in these through holes. Next, the solid-lubricant parts were vacuum-impregnated with lubricant oil, to obtain a specimen for wear test. As for hardness (Brinell hardness), the high-strength brass alloy part of the wear test specimen was measured.

(2) Comparative Examples 3-4

In order to obtain each chemical composition of Table 1, electrolytic Cu, Zn, Al, Cu—Fe mother alloy, Ni—Al mother alloy, Si—Cu mother alloy, Mn—Cu mother alloy and Fe—Al mother alloy were melted in a low frequency melting furnace, and then casted into a sand mold of 50 mm in inner diameter, 80 mm in outer diameter and 100 mm in length at a melting temperature of 1100 degrees Celsius or higher, to produce a cylindrical body. Then, the cylindrical body was subjected to machining process to produce a cylindrical bearing of 60 mm in inner diameter, 75 mm in outer diameter and 50 mm in length. Thereafter, similarly to the above examples, a specimen for wear test was prepared. Further, as for hardness (Brinell hardness), the high-strength brass alloy part of the wear test specimen was measured.

Figure 4:
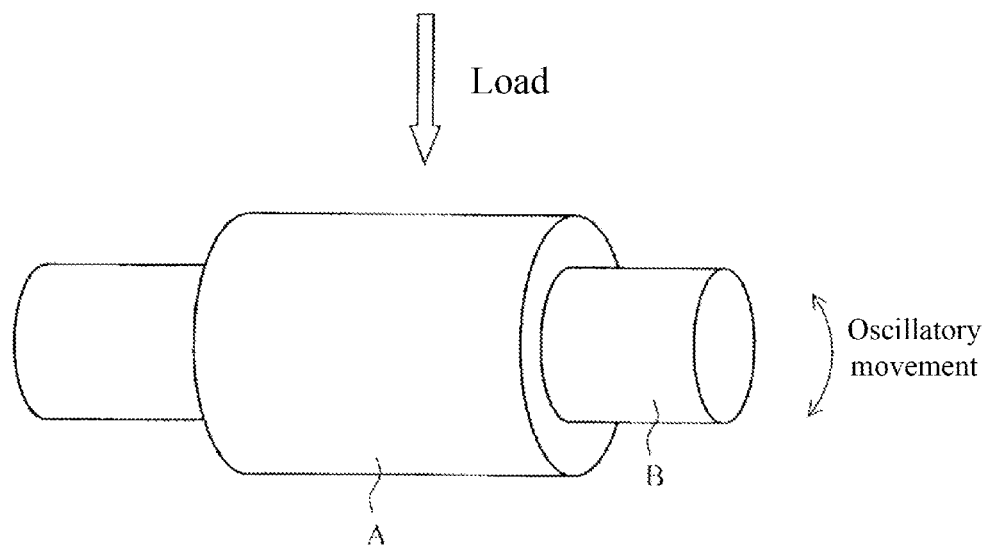
FIG. 4 is a perspective view showing a method of testing wear amount in an embodiment of the present invention.

Table 2 shows mechanical properties (degrees of Brinell hardness) and wear amount of the cylindrical bearings obtained in the above-described Examples and Comparative Examples. In Table 2, wear amount of each wear test specimen was measured by journal oscillation test shown schematically in FIG. 4. The test method was as follows. That is to say, a rotating shaft (opposite member) B was rotated in oscillation against each of the cylindrical bearings A of the above-described Examples and Comparative Examples. A load was applied and fixed to a cylinder bearing A while the rotating shaft B is rotated in oscillation at a constant sliding speed, to measure wear amount (μm) of the cylindrical bearing A and the rotating shaft B after the predetermined test period. The test conditions were as follows.

(3) Test Conditions

Sliding speed: 0.47 m/min
Surface pressure: 1000 kgf/cm$^2$ (98 MPa)
Test time: 100 hours
Movement pattern: Oscillating movement
Oscillation angle: ±45°
Material of opposite member: SC steel (S45C)
Lubricating condition: lithium grease was applied to the sliding surface at the start of the test

TABLE 1

Table 1

| | | Chemical composition (% by mass) | | | | | | | |
|---|---|---|---|---|---|---|---|---|---|---|
| | | Cu | Zn | Fe | Al | Cr | Si | Mn | Ni | Matrix |
| Example | 1 | Residual | 26.2 | 1.44 | 4.94 | 0.9 | 0.51 | — | — | β phase |
| | 2 | Residual | 25.8 | 1.63 | 4.78 | 3.57 | 1.38 | — | — | β phase |
| | 3 | Residual | 24.11 | 1.52 | 4.02 | 3.21 | 1.88 | — | — | β phase |
| | 4 | Residual | 22.31 | 1.23 | 4.88 | 1.96 | 0.93 | — | — | β phase |
| | 5 | Residual | 22.87 | 2.03 | 5.47 | 1.78 | 1.12 | — | — | β phase |
| Comparative Example | 1 | Residual | 27 05 | 0.83 | 2.95 | 0.75 | 0.44 | — | — | α + β phase |
| | 2 | Residual | 26.08 | 3.02 | 7.43 | 1.8 | 1.32 | — | — | β + γ phase |
| | 3 | Residual | 23.2 | 3.05 | 6.07 | — | 0.09 | 2.98 | 1.51 | β phase |
| | 4 | Residual | 15.03 | 3.09 | 5.98 | — | 1.47 | 6.06 | 2.03 | α + β phase |

TABLE 2

| | | | Wear amount (μm) | |
|---|---|---|---|---|
| | | Brinell hardness (HB) | Bearing | Opposite member |
| Example | 1 | 212 | 25 | 1 |
| | 2 | 215 | 24 | 0 |
| | 3 | 213 | 27 | 0 |
| | 4 | 220 | 22 | 0 |
| | 5 | 223 | 21 | 1 |
| Comparative Example | 1 | 185 | 95 | 1 |
| | 2 | 284 | 35 | 12 |
| | 3 | 235 | 63 | 0 |
| | 4 | 234 | 182 | 4 |

As for the high-strength brass alloys of the Examples of the present invention, each matrix shows single-phase structure of β phase and shows structure in which hard Fe—Cr—Si-based intermetallic compounds are dispersed in the β phase. As a result, each example of the high-strength brass alloy is superior in wear resistance. It was confirmed that the solid-lubricant-embedded type sliding members obtained by embedding solid lubricant in the high-strength brass alloys showed superior wear resistance when used as bearings, due to the superior wear resistance of the high-strength brass alloys as base metal in combination with the low frictional property of the solid lubricant.

On the other hand, as for the high-strength brass alloy of the Comparative Example 1, its matrix shows α+β phase and thus its hardness is low, and causes larger wear amount of the bearing itself. As for the high-strength brass alloy of the Comparative Example 2, its matrix shows β+γ phase and its hardness is high, and causes smaller wear amount of the bearing itself. But on the other hand, damage to the opposite member is large, and causes wear of the opposite member. Further, as for the high-strength brass alloy of the Comparative Example 3, its matrix shows single-phase structure of β phase. However, intermetallic compounds dispersed in the β phase are Fe—Cu—Al-based intermetallic compounds, and it is found that a sliding member in which solid lubricant is embedded has inferior wear resistance by increasing of its own wear amount. Further, the high-strength brass alloy of the Comparative Example 4 has markedly-reduced wear resistance although Fe—Mn—Si-based intermetallic compounds are dispersed in the matrix. This is considered to be due to small amount of Zn added to the high-strength brass alloy and appearance of α phase in the β phase of the matrix.

INDUSTRIAL APPLICABILITY

As described above, the high-strength brass alloy of the present invention has the matrix showing single-phase structure of β phase, in which Fe—Cr—Si-based intermetallic compounds are dispersed in the β phase, and thus has improved wear resistance. So the high-strength brass alloy of the present invention can be applied to sliding purposes such as a sliding bearing, a washer, a sliding plate and the like.

The invention claimed is:

1. A high-strength brass alloy for sliding member, wherein:
    the high-strength brass alloy consists only of, in terms of mass ratios, Zn in a range of from 17% or more to 28% or less, Al in a range of from 3% or more to 10% or less, Fe in a range of from 1% or more to 4% or less, Cr in a range of from 0.1% or more to 4% or less, Si in a range of from 0.5% or more to 3% or less, a remnant including Cu, and inevitable impurities; and
    a matrix shows single-phase structure of β phase, while in the structure Fe—Cr—Si-based intermetallic compounds are dispersed in the β phase.

* * * * *